Feb. 19, 1935.  R. E. WILSON  1,991,971
METHOD OF DECOMPOSING HYDROCARBON OILS
Filed Dec. 31, 1930  3 Sheets-Sheet 1
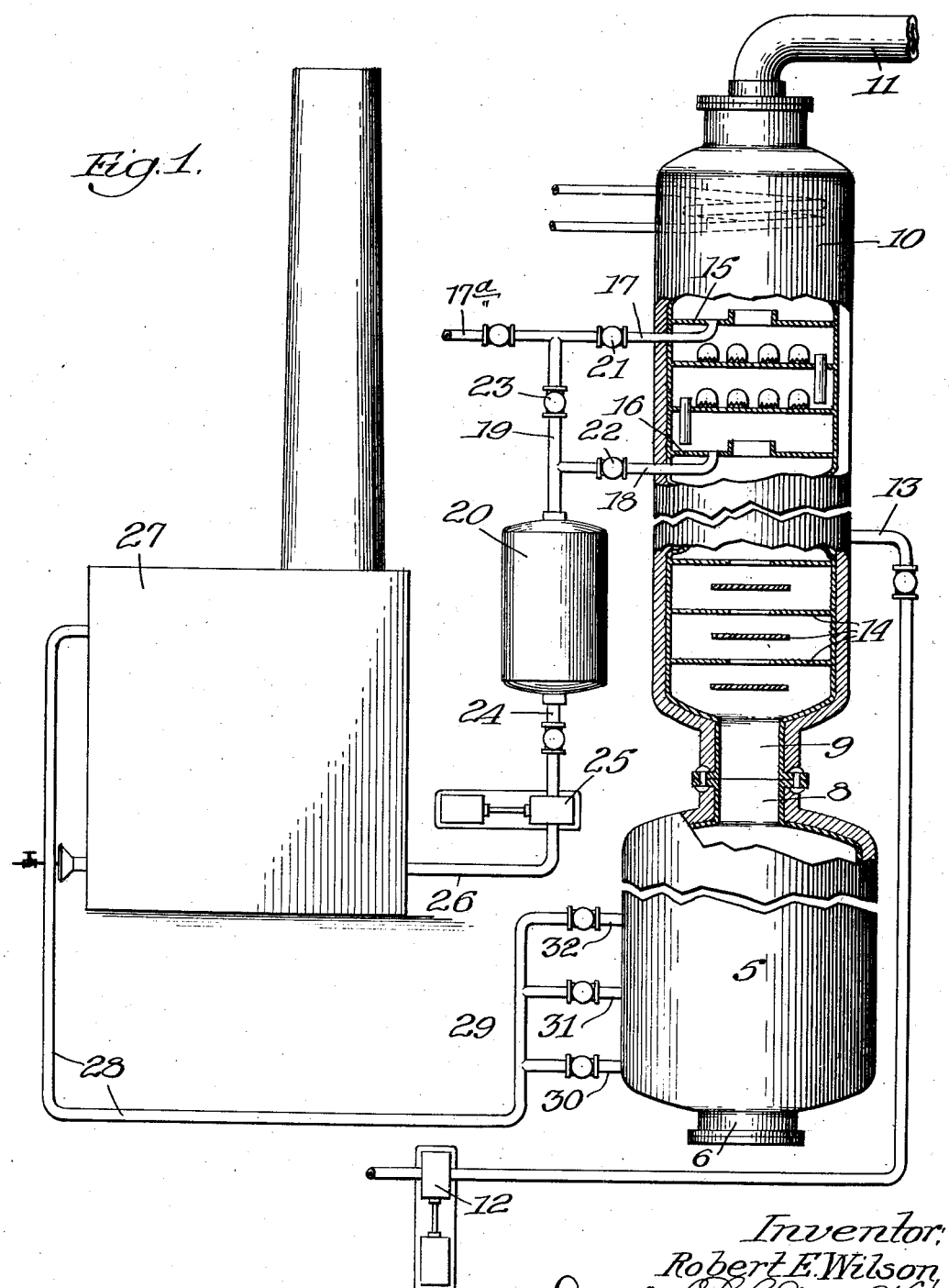

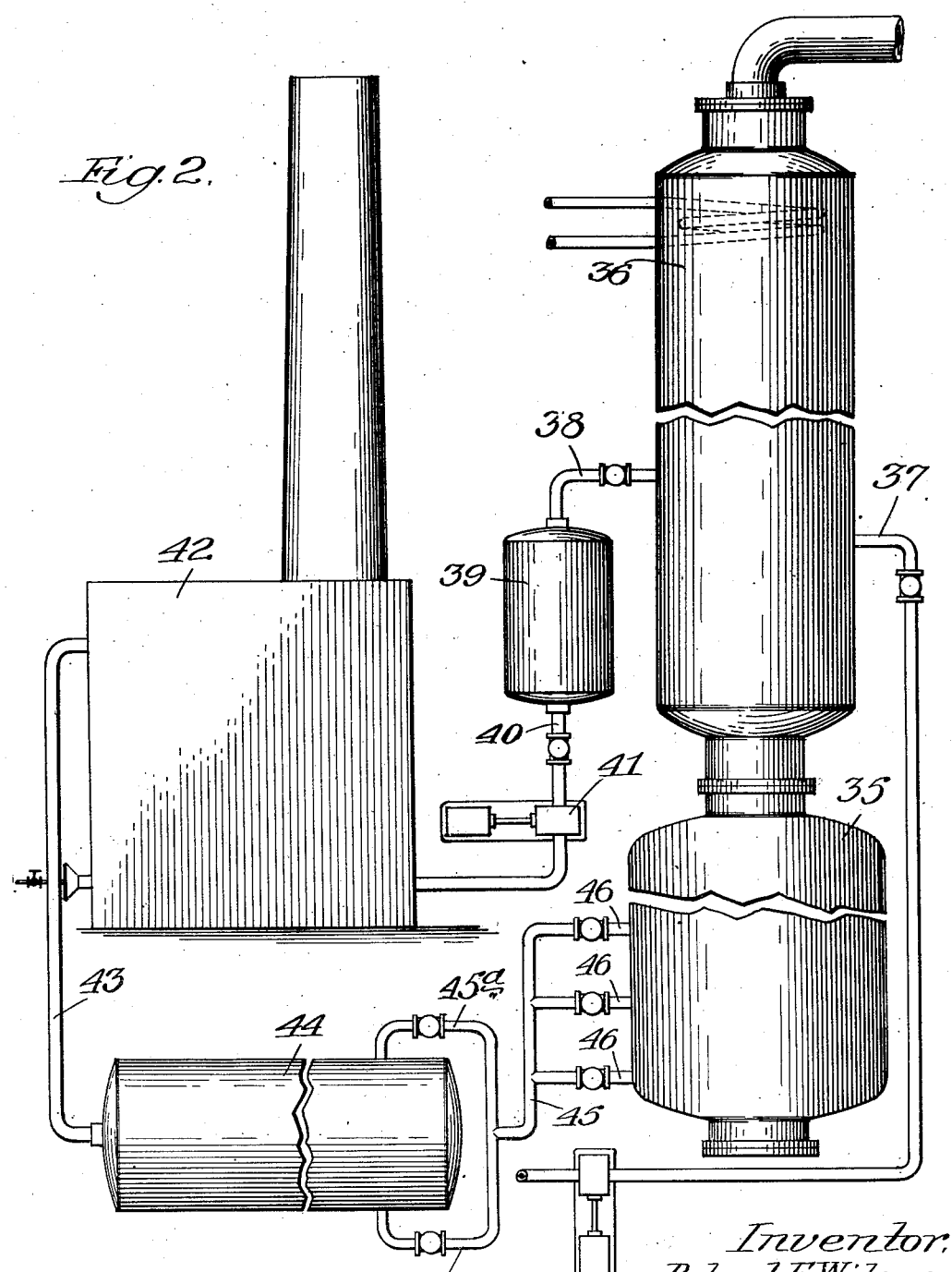

Feb. 19, 1935.  R. E. WILSON  1,991,971
METHOD OF DECOMPOSING HYDROCARBON OILS
Filed Dec. 31, 1930   3 Sheets-Sheet 3
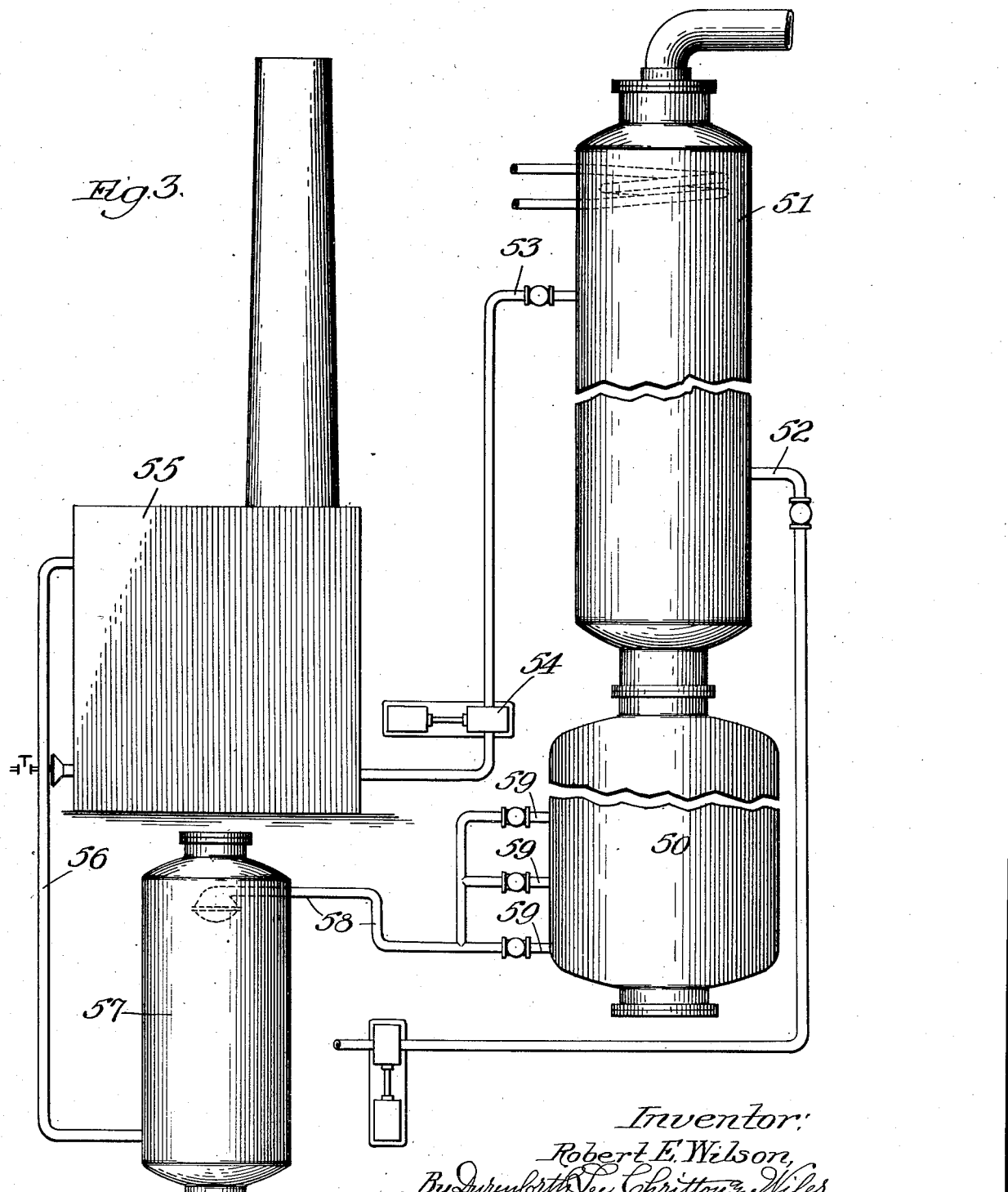

Patented Feb. 19, 1935

1,991,971

UNITED STATES PATENT OFFICE 1,991,971

METHOD OF DECOMPOSING HYDROCARBON OILS

Robert E. Wilson, Chicago, Ill., assignor to Standard Oil Company, Chicago, Ill., a corporation of Indiana Application December 31, 1930, Serial No. 505,857

1 Claim. (Cl. 196—58)

The present invention relates to improvements in the decomposition of residual oils, crude oils and the like to coke and more particularly to such a process wherein a product of the nature of gasoline is formed as the principal or sole liquid product of the decomposition. It will be fully understood from the following description, illustrated by the accompanying drawings, in which:

Figure 1 is a diagrammatic view, partly in section, of apparatus suitable for carrying the invention into effect;

Fig. 2 is a similar diagrammatic view of a modified form of apparatus for carrying out the invention; and Fig. 3 is a similar diagrammatic view of a further modified form of apparatus for carrying out the invention.

Referring more particularly to the drawings, in Fig. 1 the numeral 5 indicates a suitable decomposition or coking chamber, preferably lagged, and provided at its lower end with a large opening 6 for removal of coke, closed by a suitable manhead 7. At its upper end, the coking chamber 5 is provided with a vapor outlet 8, which is connected to the inlet 9 of a column or tower 10, which is provided internally with suitable fractionating and trap-out plates as more fully hereinafter set forth. At its top, the column 10 is provided with a vapor outlet pipe 11, leading to a suitable condenser and gas separator (not shown). Suitable cooling means, such as the coil 10$^a$, are provided in the upper part of column 10. The residual oil or crude oil supplied to the system for treatment is fed by pump 12 through the valved line 13 to an intermediate point in the tower. The plates within the tower below the inlet of the line 13 are suitably baffle plates, for example, of the disk and doughnut type, as indicated at 14.

At suitable points in the tower above the opening of the inlet pipe 13, the trap-out plates 15 and 16 are provided to permit the collection and removal from the column 10 of distillates of the desired characteristics. From these trap-out plates 15 and 16, the lines 17 and 18 respectively lead to a manifold 19, by which they may be connected with an accumulator tank or reservoir 20. The lines 17 and 18 are provided with control valves 21 and 22 respectively, and a control valve 23 is likewise provided in the manifold 19 between the points of connection of the lines 21 and 22 therewith.

From the accumulator or reservoir 20, oil is withdrawn through line 24 by pump 25 and discharged through line 26 to the pipe still furnace 27, in which it is heated while passing in continuous flow through the pipe still. The heated oil leaves the pipe still through the line 28 and enters the manifold 29, from which it is discharged through one of the valved inlet lines 30, 31 or 32 into the coking chamber 5. These valved inlet lines are provided at different levels so that if a lower inlet pipe becomes clogged, the flow of heated oil and vapors may be diverted to an inlet at a higher level.

In carrying out the process of the present invention, the oil to be treated, which is one containing residual constituents, such as a crude oil residue, heavy crude oil from which gasoline has been preliminarily removed, or other residual product is supplied to the tower 10 through the line 13 and descends the tower, countercurrent to the hot vapors rising from the coking chamber 5. The coking chamber is, as hereinafter pointed out, maintained at atmospheric or low superatmospheric pressure, say up to 60 lbs. and at a suitable coking temperature, say from 790 to 840° F., or higher. The hot vapors contact directly with the oil supplied to the tower while the oil is flowing rapidly downward and an effective direct heat interchange is secured with rapid heating of the oil. The passages of tower 10 in which this heat interchange takes place are of large size and do not readily coke up. The walls of this portion of the column 10 are preferably formed of or lined with nonferrous material, such as chromium, chromium alloy, ceramic material or the like, to retard coke formation and adherence. By this heating action, the hot vapors remove from the oil fed in its volatilizable constituents, and its residual or unvaporizable constituents are brought to a high temperature before passing downwardly through the connections 9 and 8 into the coking chamber to be heated to coking temperature and coked therein. The maintenance of coking conditions in the coking chamber is facilitated by this preliminary effective heating of the unvaporized portion of the oil. It will be apparent that some heavy constituents and entrained tarry matter will be removed from the vapors rising from the coking chamber by the entering oil, and will be returned with the unvaporized constituents of the latter to the coking chamber for further treatment.

The vapors from the coking chamber together with the vaporized constituents of the oil fed into the column 10 are subjected to fractionation in the latter to condense and remove therefrom constituents heavier than the desired low boiling products, the vapors of the latter passing out through the vapor line 10 for separate condensation and separation of uncondensible gas, in the manner well known in the art. The condensate formed in the tower may be collected on the trap-out plates 15 and 16, and removed through the lines 17 or 18 as desired. Thus, a condensate having an end point of 600 to 700° F. may be removed from the upper trap-out plate 15 through the line 17, or if a heavier product is desired, say one having an end point above 700° F., the valve 21 in line 17 may be closed and the desired liquid product may be removed from the trap-out plate 16 through the line 18. All or part of the condensate thus removed passes through manifold 19 into the accumulator or reservoir tank 20, which is suitably insulated to prevent loss of heat. Some condensate may be removed through valved line 17ª, for use as gas or furnace oil or as a charging stock for a cracking system. The condensate product is withdrawn from the accumulator or reservoir tank 20 through line 24 by pump 25 and forced through the pipe still in furnace 27 in which it is brought to a high cracking temperature, preferably 900° or higher, under substantial superatmospheric pressure, say 100 lbs. or higher. The oil is passed through the pipe still at a velocity to prevent deposition of coke therein, and ordinarily a substantial cracking of the oil is secured in its passage through the pipe still, say from 10 to 25% of low boiling products in the gasoline boiling point range being formed therein.

The hot oil products are discharged into the coking chamber 5 through one of the valved inlet lines 30, 31 or 32, pressure being reduced thereon to atmospheric or low superatmospheric pressure, say up to 60 lbs. A suitable coking temperature, say at least 780 to 790° F., is maintained in the coking chamber 5 and the unvaporized and tarry constituents of the oil passed through the pipe still, as well as the residual constituents received from the tower 10 are decomposed in the coking chamber to a substantially dry coke. The vaporized products from the pipe still as well as the vapor products formed by the coking action in the chamber 5 pass upwardly into the tower 10, for further treatment as hereinbefore set forth.

The conditions which are maintained in the pipe still may be varied in accordance with the character of oil put through the pipe still and with the character of cracking which it is desired to effect.

For example, condensate oil having an end point of about 750° F. may be withdrawn from the tower 10 through the line 18 and, in passage through the pipe still, be brought to a temperature of 900 to 950°, say about 920°, at a pressure of 150 to 500 lbs., say 200 lbs.

The cracked products, most or all of which are vaporized under these conditions, enter the coking chamber in which a pressure below 60 lbs. and preferably around 25 lbs. gauge is maintained, the temperature therein being 800 to 825° F. Complete coking of residual products is secured therein and the vapors passed into the tower 10 for contact with the entering oil and fraction as above set forth.

In a modified operation, a lighter condensate is taken off from the tower 10 through the line 17, for example, one having an end point below 700° F., say of 600 to 650° F. In passage through the pipe still, it is brought to a temperature of 900 to 950° F. under an outlet pressure of 175 to 250 lbs., under these conditions being substantially completely vaporized. The products, largely vapors, are discharged into the coking chamber 5, in which a pressure of 15 to 20 lbs. gauge and a temperature of 800 to 825° F. is maintained and coking secured. As hereinbefore described, the vapors from the coking chamber pass into the column 10 for contact with the feed oil and fractionation.

In carrying out the operation, a suitable procedure may be employed in order to secure a further conversion of the heated oil products passed through the pipe still before they enter the coking chamber. Modifications of apparatus suitable for carrying out such procedures are shown in Figs. 2 and 3. In Fig. 2, the numeral 35 designates a coking chamber and the numeral 36 a tower similar to coking chamber 5 and tower 10 of Fig. 1, and interconnected in a similar manner. A feed stock containing residual products is supplied to the tower 36 through the valve controlled line 37. A condensate product formed in the tower 36 is trapped out and drawn off through line 38 to accumulator or storage drum 39, from which it is withdrawn through line 40 by pump 41, which forces it through the pipe still furnace 42. In the latter it is heated to a suitable high cracking temperature while in continuous flow through the pipe still, and passes out through the line 43 into the enlarged reaction chamber 44, in which its is retained for a sufficient period at high cracking temperature to permit substantial further conversion. The oil is kept under superatmospheric pressure in the pipe still and reaction chamber 44, and from the latter passes through the line 45 and one of the valve controlled inlets 46 into the coking chamber 35.

In general the operation of the modification shown in Fig. 2 is similar to that above described in connection with Fig. 1. In this method of operation, the distillate product withdrawn from the tower 36 for passage through the pipe still 42 is preferably one containing higher boiling constituents; for example, having an end point of at least 700 and preferably about 750° F. In passage through the pipe still it is raised to a temperature of 900° F. or higher, say 940° F. while maintaining thereupon a high superatmospheric pressure; say a pressure of 700 lbs. or higher at the outlet of the coil. The oil then passes into the insulated reaction chamber 44, which is at approximately the same pressure and where a substantial further cracking of the constituents of the heated oil takes place by the contained heat of the oil. In the reaction chamber 44, there is a slight drop in temperature of the oil, say about 40° F., and preferably not over 50° F., some liquid being ordinarily present under these conditions. From the reaction chamber 44, the hot vapor and liquid products are discharged through valved lines 45ª and 45ᵇ respectively to line 45, from which the mixed products pass into the coking chamber 35, which is maintained under the conditions hereinbefore described in connection with the modification of Fig. 1, and wherein the heat of the products received from the reaction chamber 44 serves to decompose into coke and vapor products the unvaporized constituents of the oil which is passed through the pipe still 42 and the reaction chamber 44 as well as the unvaporized constituents of the oil supplied through the feed line 37 into the tower 36.

In the modification shown in Fig. 3, the coking chamber 50 and tower 51 are constructed and operated in a manner substantially similar to the corresponding parts shown in Fig. 1 and the residue containing feed stock is supplied to the tower 51 through the valved line 52 as illustrated in connection with Fig. 1. In the modification shown in Fig. 3, the distillate stock withdrawn from the tower 51 is preferably somewhat lighter in character, for example, having an end point of 600 to 650° F. It is withdrawn through the line 53 by pump 54 and forced through the pipe still 55, in which it is substantially completely vaporized and the vapors heated to a high cracking temperature, suitably between 900 and 1000° F.; for example, 925° F. A superatmospheric pressure of, say, between 125 and 300 lbs. and preferably from 175 to 250 lbs. is maintained at the outlet of the pipe still 55. From the pipe still the oil vapors pass through the line 56 into the vertical, insulated chamber 57, through which they pass slowly and with a minimum of turbulence, a substantial additional cracking of the vaporized products taking place therein.

From the reaction chamber 57, the hot vapor products with any entrained tarry matter which they may contain passes out through the line 58 and discharges, with reduction of pressure, to a suitable one of the valved inlets 59 into the coking chamber 50, in which, by the heat they contain, they maintain the required conditions for coking residual products received in the drum or coking chamber.

I claim:

In a combined coking and cracking process, the method that comprises retaining residual constituents of petroleum in a coking zone in the lower portion of a combined coking and dephlegmating tower, passing evolved vapors upwardly through the tower and subjecting them to fractionation therein, introducing feed stock containing residual oil materials into an intermediate point of said tower to dephlegmate vapors therein, causing unvaporized constituents of said feed stock to pass downwardly into the coking zone of said tower, withdrawing a condensate fraction from an intermediate point in the tower at a point above that at which said feed stock is introduced, passing the condensate fraction to a heating coil and subjecting it therein to a cracking temperature, passing the heated oil into an enlarged reaction chamber maintained at cracking temperature under a pressure of the order of 700 pounds, separately removing the liquid and vapor constituents from the lower and upper portions, respectively, of the enlarged chamber, reducing the pressure on said constituents and delivering them at cracking temperature into the coking zone of the tower to thereby maintain the residual constituents at a coking temperature under a low pressure not exceeding about sixty pounds to effect the conversion thereof into a coke residue.

ROBERT E. WILSON.